United States Patent
Haruna et al.

[11] 3,723,681
[45] Mar. 27, 1973

[54] COMBINATION IMPACT DETECTOR AND SWITCH DEVICE

[75] Inventors: Takashi Haruna, Yokosuka; Akira Shimano, Yokohama, both of Japan

[73] Assignee: Nissan Motor Company, Limited, Yokahama, Japan

[22] Filed: Mar. 19, 1971

[21] Appl. No.: 125,951

[30] Foreign Application Priority Data

June 25, 1970 Japan ................................ 45/63361

[52] U.S. Cl. ............................... 200/61.53, 180/103
[51] Int. Cl. ............................................. H01h 35/14
[58] Field of Search .......... 180/82, 103; 280/150 AB; 200/61.45, 61.53, 61.54

[56] References Cited

UNITED STATES PATENTS

| | | | |
|---|---|---|---|
| 2,637,791 | 5/1953 | Bleier | 200/61.53 |
| 3,379,059 | 4/1968 | Wiley | 200/61.45 |
| 2,854,537 | 9/1958 | Sternburgh | 200/61.45 |
| 2,921,999 | 1/1960 | Ziegler | 200/61.53 |
| 3,380,046 | 4/1968 | Paonessa | 200/61.54 R |
| 3,556,556 | 1/1971 | Goetz | 180/103 |

*Primary Examiner*—Kenneth H. Betts
*Assistant Examiner*—John A. Pekar
*Attorney*—John Lezdey

[57] ABSTRACT

Herein disclosed in a combination impact detector and switch device which is responsive to an impact exerted thereon in a direction falling within a predetermined angular range and which includes a normally open switch and a spring-loaded spherical weight normally pressed upon a tapered inner peripheral wall to keep the switch open and caused to leave the peripheral wall to close the switch when an impact greater than a predetermined magnitude is transferred thereto in a direction contained in the angular range limited by the tapered inner peripheral wall. The device may be utilized in various vehicluar safety apparatus for protecting a vehicle occupant from injury by a collision, wherein the switch may be connected to an actuator of the safety device to cause the safety device to assume a protective position when an impact is encountered by the motor vehicle.

3 Claims, 1 Drawing Figure

PATENTED MAR 27 1973
3,723,681
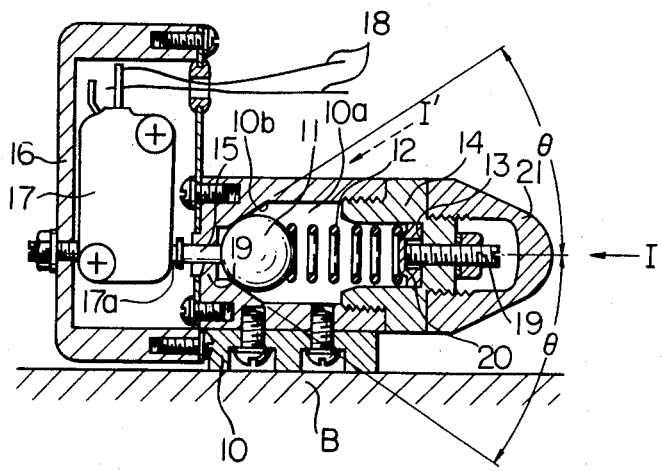
INVENTORS
TAKASHI HARUNA & AKIRA SHIMANO
BY John Lezoley
ATTORNEY

COMBINATION IMPACT DETECTOR AND SWITCH DEVICE

This invention relates to a combination impact detector and switch device having a switch which is closed when a mechanical impact greater than a predetermined magnitude is detected by the device.

Although the device herein proposed will find a variety of useful applications wheresoever detection of mechanical impacts is of practical concern, the same can be advantageously utilized for actuation of vehicular safety apparatus which are adapted to protect a vehicle occupant from injury which would otherwise be invited by a collision of the motor vehicle.

The vehicular safety apparatus includes a device which is constructed so as to have rest and protective positions and to be actuated to protective positions as soon as collisions are encountered by the motor vehicles and, for this purpose, it is important that impacts resulting from the collisions be detected reliably and instantaneously. Various impact detecting devices have thus far been proposed as capable of responding to such impacts fast and reliably. These impact detecting devices are required to be responsive to only such impacts that cause decelerations greater than certain magnitudes so that the safety apparatus are kept intact when the motor vehicles encounter permissibly light collisions as during garaging. In order to enable the safety apparatus to be actuated in response to frontal collisions in different directions, it is desired that the impact detecting devices be capable of responding to impacts exerted thereon in different directions, Viz., not only in the fore-and-aft direction but in directions deviating therefrom at certain angles. An example of the impact detecting devices of this specific character as proposed prior to this invention uses three separate detecting elements which are respectively responsive to impacts in three angularly different directions. The use of such three separate detecting elements is reflected by an increased number of components and parts of the device and accordingly by increased production cost.

It is, therefore, an object of this invention to provide an improved combination impact detector and switch device which is capable of rapidly and reliably responding to impacts greater than a predetermined magnitude.

It is another object of the invention to provide an improved combination impact detector and switch device which is responsive to an impact exerted thereon in a direction falling within a predetermined angular range and which is simple in construction and economical to manufacture.

The combination impact detector and switch device to achieve these and other objects includes a stationary casing having bore which terminates with a forwardly tapered inner peripheral wall, a spherical weight mounted in the bore of the casing and disengageably seated on the tapered inner peripheral wall, a compression spring also mounted in the bore of the casing and seated at its foremost end on the spherical weight for biasing the spherical weight to press upon the tapered inner peripheral wall, a plunger means projecting from the spherical weight and extending outwardly through the casing away from the compression spring, and a normally-open switch having a movable contact which is normally pressed to a retracted position to keep the switch open by an action of the compression spring through the plunger means and which is caused to protrude from the retracted position to close the switch when an impact is transferred to the device to produce in the spherical weight a force of inertia greater than a predetermined magnitude to cause the spherical weight to be unseated from the tapered inner peripheral wall against the action of the compression spring for releasing the movable contact from the plunger means. The compression spring herein used has a spring constant selected to yield to an opposing force which is greater than the above-mentioned predetermined magnitude.

Where the combination impact detector and switch device according to this invention is used in the vehicular safety apparatus of the described character, the switch forming part of the device should be connected to an actuating means of the safety apparatus so that the actuating means is energized when the impact greater than the predetermined magnitude is detected.

The accompanying drawing illustrates, in sectional view, a preferred embodiment of this invention.

As illustrated, the combination impact detector and switch device embodying this invention includes a stationary casing 10 which has formed therein a longitudinally extending bore 10a. This bore 10a terminates with inner peripheral wall 10b which is tapered forwardly. Where the shown device is used on the vehicular safety apparatus, the bore 10a should extend substantially in parallel to a fore-and-aft direction of the motor vehicle. A substantially spherical weight 11 is mounted in the bore 10a of the casing 10. The spherical weight 11 is disengageably seated on the tapered inner peripheral wall 10b which thus serves as a seat for the spherical weight and movable in directions within an angular range corresponding to a tapered angle of the inner peripheral wall 10b. This spherical weight 11 is biased to press upon the tapered inner peripheral wall 10b by means of a compression spring 12 which is also mounted in the bore 10a. The compression spring 12 is seated at its foremost end on the spherical weight 11 and at its rearmost end on a spring seat 13 which is received in an end plug 14 connected to the casing 10. The casing 10 has formed in its foremost end wall an aperture (not numbered) through which a plunger means 15 extends outwardly of the casing 10. As shown, the plunger means 15 engages at one end thereof with the spherical weight 11.

The casing 10 is connected at its forward end to a bracket 16 in which a normally-open electric switch 17 is housed. This switch 17 has a movable contact 17a which is aligned with a leading end of the plunger means 15. With the spherical weight 11 pressed against the tapered inner peripheral wall 10a by an action of the compression spring 12, the plunger means 15 is held in a protruded position to press the movable contact 17a to a retracted position to open the switch 17. The switch 17 is connected through lines 18 to a suitable electric circuit.

The compression spring 12 is prestressed so as to provide a spring constant which is adapted to yield to an opposing force greater than a predetermined magnitude. Such spring constant may be adjusted by means of an adjusting screw 19 extending through a threaded aperture (not shown) formed in the end plug 14 and terminating at an inner face of a spring seat 20 on the opposite face of which is seated the compression spring in this instance. Designated by reference numeral 21 is a closure for the adjusting screw 19 thus arranged.

Where the shown device is utilized on the vehicular safety apparatus, the spring constant of the compression spring 12 should be selected to overcome an opposing force resulting from impacts caused permissibly light collision of the motor vehicle as during garaging, thereby preventing from the safety apparatus from being actuated objectionably. In this instance, the lines 18 may be connected to an actuator for the safety apparatus to energize the actuator when the switch 17 is closed, while the shown device may be securely mounted on any portion of the vehicle body which is indicated by reference character B.

When, now, an impact is transferred to the shown device and a force of inertia greater than the above-mentioned predetermined magnitude is produced in the spherical weight 11, then the spherical weight is caused to be unseated from the tapered inner peripheral wall 10b against the action of the compression spring 12. The plunger means 15 is consequently moved away from the movable contact 17a of the switch 17 so that the movable contact is released from the plunger means. The movable contact 17a is permitted to protrude from the retracted position, closing the switch 17.

Since, in this instance, the spherical weight 11 is seated on the tapered inner peripheral wall 10b, the spherical weight can be unseated from the wall 10b not only when the impact is imparted to the device in the direction of arrow I in a solid line but when the impact is applied thereto in directions within an angular range corresponding to a tapered angle of the inner peripheral wall 10b. If the inner peripheral wall 10b is tapered at an angle $\theta$, the spherical weight 11 is responsive to those impacts which are transferred thereto in angular directions ranging from the direction of arrow I to the direction of arrow I' in a broken line. The direction of arrow I may be in line with the fore-and-aft direction of the motor vehicle where the shown device is employed in the vehicular safety apparatus.

What is claimed is:

1. A combination impact detector and switch device comprising a stationary casing having formed therein a bore which terminates with a forwardly tapered inner peripheral wall, a substantially spherical weight mounted in said bore, said spherical weight being disengageably seated on said tapered inner peripheral wall and movable in directions within an angular range corresponding to a tapered angle of said inner peripheral wall, a compression spring mounted in said bore and seated at its foremost end on said spherical weight for biasing the spherical weight to press upon said tapered inner peripheral wall, said compression spring having a spring constant to yield to an opposing force greater than a predetermined magnitude, a plunger means extending through said casing and engaging at one end thereof with said spherical weight, and a normally-open switch having a movable contact engaging with the other end of said plunger means, said movable contact being normally pressed to a retracted position to open said switch by an action of said compression spring through said plunger means and caused to protrude from said retracted position to close said switch when an impact greater than said predetermined magnitude is transferred to said device in a direction contained in said angular range to produce in said spherical weight a force of inertia greater than said predetermined magnitude to cause said spherical weight to move in said last-mentioned direction against the action of said compression spring for releasing said movable contact from said plunger means.

2. A combination impact detector and switch device according to claim 1, further comprising a spring seat on which said compression spring is seated at its rearmost end and an adjusting screw terminating at an inner face of said spring seat for adjusting the spring constant of said compression spring.

3. A vehicular safety apparatus for protecting a vehicle occupant from injury when a collision is encountered by a motor vehicle, comprising a safety device having rest and protective positions and including an actuator for actuating said safety device to the protective position when energized and a combination impact detector and switch device which comprises a casing that is held stationary relative to a vehicle body of said motor vehicle and which has formed therein a bore extending substantially in parallel to a fore-and-aft direction of the motor vehicle and terminating with a forwardly tapered inner peripheral wall, a substantially spherical weight mounted in said bore, said spherical weight being disengageably seated on said tapered inner peripheral wall and movable in directions within an angular range corresponding to a tapered angle of said inner peripheral wall, a compression spring mounted in said bore and seated at its foremost end on said spherical weight for biasing the spherical weight to press upon said tapered inner peripheral wall, said compression spring having a spring constant to yield to an opposing force greater than a predetermined magnitude, a plunger means extending through said casing and engaging at one end thereof with said spherical weight, and a normally open switch connected to said actuator and having a movable contact engaging with the other end of said plunger means, said movable contact being normally pressed to a retracted position by an action of said compression spring through said plunger means and caused to protude from said retracted position when an impact resulting from a collision encountered by said motor vehicle is transferred to said combination impact detector and switch device in a direction contained in said angular range to produce in said spherical weight a force of inertia greater than said predetermined magnitude to cause the spherical weight to move in said last mentioned direction against the action of said compression spring for releasing said movable contact from said plunger means whereby said actuator is energized to actuate said safety device to said protective position.

* * * * *